United States Patent Office 2,780,645
Patented Feb. 5, 1957

2,780,645

PREPARATION OF CALCIUM DL-PANTOTHENATE

Herbert L. Wehrmeister, Terre Haute, Ind., assignor to Commercial Solvents Corporation, Terre Haute, Ind., a corporation of Maryland No Drawing. Application January 15, 1954,
Serial No. 404,389

11 Claims. (Cl. 260—534)

My invention relates to a method for producing calcium DL-pantothenate. More particularly it relates to a method for producing calcium DL-pantothenate from 2,4-dihydroxy-3,3-dimethylbutyronitrile, beta-alanine and calcium hydroxide.

Pantothenic acid, or vitamin $B_3$, has been found to possess growth promoting properties in many forms of animal life. The preferred form of the vitamin for use in animal feeds and multiple vitamin capsules is the calcium salt. Prior processes for the production of pantothenic acid have involved the reaction of beta-alanine with 2-hydroxy-3,3-dimethyl-4-butyrolactone, such as the process set forth in U. S. Patent 2,396,477, issued to Eric T. Stiller on March 12, 1946. This gamma lactone, however, is difficult to isolate and purify, requiring extensive extraction and distillation procedures. The fact that the gamma lactone is very hygroscopic and lyophilic makes it quite difficult to separate from aqueous solutions. Although many processes have been advanced for the separation of the gamma lactone in relatively pure form many are not wholly successful and all are expensive and cumbersome.

I have now discovered a method for the production of calcium DL-pantothenate directly which does not pass through the intermediate 2-hydroxy-3,3-dimethyl-4-butyrolactone. My invention comprises the reaction of 2,4-dihydroxy-3,3-dimethylbutyronitrile, with beta-alanine and calcium hydroxide to produce directly the calcium DL-pantothenate.

The 2,4-dihydroxy-3,3-dimethylbutyronitrile reacted in my process may be produced by any convenient method. One convenient method for its production is as set forth in U. S. Patent 2,443,334, issued June 15, 1948, to Russell W. Van House. According to the process of this patent, strong aqueous formaldehyde is reacted with isobutyraldehyde in the presence of a water-soluble cyanide such as sodium cyanide or potassium cyanide. To the reaction mixture is then added a sufficient amount of a water-soluble acid stronger than hydrocyanic acid to bring the mixture to a neutral pH. The resulting nitrile usually separates as an oily layer, but when such a layer does not readily form the nitrile can be recovered by the addition of salting out agents such as sodium chloride, calcium chloride, etc. or it may be recovered by extraction with solvents such as benzene, 1-butanol, etc.

The nitrile thus produced can be further purified or employed in my process in the form in which it is isolated from the reaction mixture.

The beta-alanine employed in my new process can be produced and purified in any convenient manner.

In carrying out my new process I dissolve the 2,4-dihydroxy-3,3-dimethylbutyronitrile isolated from the reaction mixture in which it is produced in a lower alcohol solvent which acts as a medium for the subsequent reaction. To the alcoholic solution I then add approximately an equivalent weight each of beta-alanine and calcium hydroxide, and reflux the resulting mixture until the reaction is substantially complete. Thereafter the mixture is filtered hot and the calcium DL-pantothenate recovered by any convenient means from the filtrate.

The lower alcohols suitable as media for my process are those lower aliphatic alcohols such as methyl, ethyl, propyl, and butyl alcohols and mixtures of any of these.

The following examples will further serve to illustrate my invention. I do not intend to be limited by amounts or form of the reactants used. The scope of my invention is as set forth in this specification and the appended claims.

*Example I*

To a stirred and cooled solution of 54 grams of sodium cyanide in 130 ml. of water was added dropwise a mixture of 72 grams of isobutyraldehyde and 81 grams of 37% aqueous formaldehyde. The temperature was maintained at from 8 to 20° C. during the addition. The mixture was stirred for 1½ hours at 0 to 10° C. and for 2 additional hours at room temperature. There was then added 100 ml. of concentrated hydrochloric acid while maintaining the temperature at 30 to 40° C. The mixture was stirred for one hour at room temperature and set aside overnight. The following day the mixture was extracted with two 100-ml. portions of ethyl ether, and the ether extract dried with 20 grams of sodium sulfate. Most of the excess ether was removed by evaporation at reduced pressure, which resulted in a residue of 133 grams of oily material still containing some ether.

To a solution of 34 grams of this oily material in 200 ml. of methanol was added 24 grams of beta-alanine and 10 grams of calcium hydroxide. The resulting mixture was refluxed for 7½ hours. After refluxing, the mixture was filtered hot through Celite and the methanol filtrate was evaporated to dryness in a vacuum desiccator. The residue was ground and dried in a vacuum oven to yield 54 grams of amorphous material melting with decomposition between 140° and 160° C. When analyzed by the biological assay procedure of Skeggs and Wright, Journal of Biological Chemistry, 156, 21 (1944), using *Lactobacillus arabinosus* as the test organism the dried amorphous material showed the presence of substantial quantities of calcium DL-pantothenate possessing strong growth promoting properties.

*Example II*

To a stirred and cooled mixture of 81 grams of 36–38% formaldehyde and 72 grams of isobutyraldehyde was slowly added 54 grams of sodium cyanide. The mixture was stirred at 5–10° C. for 1 hour and then at room temperature for 1 hour. The mixture was then cooled in an ice water bath and 100 ml. of concentrated hydrochloric acid added. The temperature rose to about 70° whereupon the mixture was set aside in an ice bath for 2 hours. The mixture was filtered and the filter cake washed with 200 ml. of 1-butanol. The 2-layer filtrate was thoroughly mixed and then allowed to separate. The lower layer was extracted with an additional 50 ml. of 1-butanol. The combined 1-butanol extracts were dried with sodium sulfate and sodium carbonate, the dried butanol solution was then treated with activated charcoal, and filtered. A total filtrate volume of 310 ml. of a butanol solution of the nitrile was obtained.

A 50-ml. portion of the above solution was mixed with 50 ml. of methanol. Nine grams of beta-alanine and 4 grams of calcium hydroxide were added and the mixture refluxed at 73–75° C. for 2½ hours. The mixture was then filtered hot through Celite. The filtrate was cooled to room temperature and added dropwise to 250 ml. of stirred acetone over a 50 minute period. The precipitate was collected by filtration, washed twice with 100-ml. portions of acetone, dried in a vacuum desiccator over phosphorus pentoxide, and in a vacuum oven at 78–80°

C. The tan solid weighed 10.5 grams and melted with some decomposition at 143–145° C. When analyzed by the biological assay procedure in the same manner as in Example I using *Lactobacillus arabinosus* as the test organism the solid showed a substantial concentration of calcium DL-pantothenate possessing growth promoting properties.

The calcium DL-pantothenate produced by my method may be employed as the dried, ground amorphous solid to supplement animal feeds. The racemic salt may also be resolved by known procedures to isolate the biologically active dextrorotatory modification for use in multivitamin capsules and similar forms for administration.

Now having described my invention what I claim is:

1. The method of synthesizing calcium DL-pantothenate which comprises reacting 2,4-dihydroxy-3,3-dimethylbutyronitrile with beta-alanine and calcium hydroxide in a lower aliphatic alcohol medium.

2. The method of synthesizing calcium DL-pantothenate which comprises reacting 2,4-dihydroxy-3,3-dimethylbutyronitrile with beta-alanine and calcium hydroxide in a lower aliphatic alcohol medium at the reflux temperature of the mixture.

3. The method of synthesizing calcium DL-pantothenate which comprises reacting 2,4-dihydroxy-3,3-dimethylbutyronitrile with beta-alanine and calcium hydroxide in methanol at the reflux temperature of the mixture.

4. The method of synthesizing calcium DL-pantothenate which comprises reacting approximately equivalent weights of 2,4-dihydroxy-3,3-dimethylbutyronitrile, beta-alanine and calcium hydroxide.

5. The method of synthesizing calcium DL-pantothenate which comprises reacting approximately equivalent weights of 2,4-dihydroxy-3,3-dimethylbutyronitrile, beta-alanine and calcium hydroxide in a lower aliphatic alcohol medium.

6. The method of synthesizing calcium DL-pantothenate which comprises reacting approximately equivalent weights of 2,4-dihydroxy-3,3-dimethylbutyronitrile, beta-alanine and calcium hydroxide in a lower aliphatic alcohol medium at the reflux temperature of the mixture.

7. The method of synthesizing calcium DL-pantothenate which comprises reacting approximately equivalent weights of 2,4-dihydroxy-3,3-dimethylbutyronitrile, beta-alanine, and calcium hydroxide in a methanol medium.

8. The method of synthesizing calcium DL-pantothenate which comprises reacting approximately equivalent weights of 2,4-dihydroxy-3,3-dimethylbutyronitrile, beta-alanine and calcium hydroxide in a methanol medium at the reflux temperature of the mixture.

9. The method of synthesizing calcium DL-pantothenate which comprises reacting 2,4-dihydroxy-3,3-dimethylbutyronitrile with beta-alanine and calcium hydroxide in a mixture of methanol and 1-butanol at the reflux temperature of the mixture.

10. The method of synthesizing calcium DL-pantothenate which comprises reacting approximately equivalent weights of 2,4-dihydroxy-3,3-dimethylbutyronitrile with beta-alanine and calcium hydroxide in a mixture of methanol and 1-butanol at the reflux temperature of the mixture.

11. In the manufacture of DL-pantothenate, the process which comprises reacting isobutyraldehyde, formaldehyde and an alkali metal cyanide to form 2,4-dihydroxy-3,3-dimethylbutyronitrile, extracting the latter from the reaction products with a lower aliphatic alcohol, adding beta-alanine and approximately a chemical equivalent weight of calcium hydroxide to the extract, refluxing the resulting mixture and recovering the resulting calcium DL-pantothenate from the reaction products.

References Cited in the file of this patent
UNITED STATES PATENTS 2,234,680    Moore _____ Mar. 11, 1941

OTHER REFERENCES

Wagner: Synthetic Organic Chemistry (p. 412), publ. by Wiley & Sons, Inc. (1953), New York, N. Y.